Patented Apr. 27, 1926.

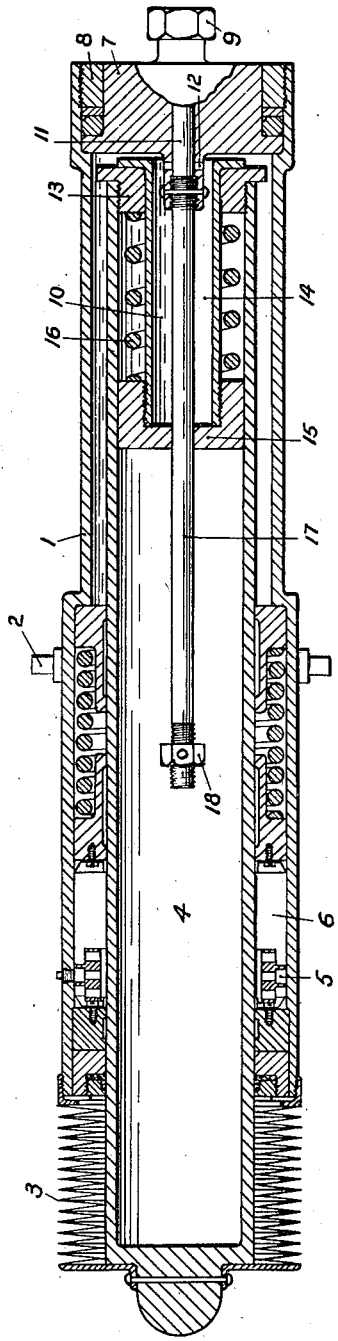

1,582,760

UNITED STATES PATENT OFFICE.

BRYAN P. JOYCE, OF DAVENPORT, IOWA.

COUNTERPOISE.

Application filed December 3, 1924. Serial No. 753,603.

*To all whom it may concern:*

Be it known that I, BRYAN P. JOYCE, a citizen of the United States, and a resident of Davenport, county of Scott, and State of Iowa, have invented an Improvement in Counterpoise, of which the following is a specification.

The subject of this invention is a counterpoise intended primarily for use on guns susceptible of high elevations though not restricted thereto.

In the employment of counterpoises with pivoted bodies it has been found that the opposing forces are approximately constant until the body attains an elevation of 45° after which the force exerted by the counterpoise is unduly excessive.

The principal object of the present invention is the provision of a simple and efficient counterpoise, the force exerted by which will vary as the part which it is counterbalancing is rocked about its pivot, the variations in such force being approximately proportional to the variations in the force exerted by gravity tending to turn the counterbalanced part about its pivot.

To these and other ends, my invention consists in the construction, arrangement, and combination of elements, described hereinafter and pointed out in the claims forming a part of this specification.

A practical embodiment of my invention is illustrated in the accompanying drawings, wherein:

The figure is a longitudinal sectional view through a counterpoise constructed in accordance with the invention.

The counterpoise forming the subject matter of this invention is designed to be mounted in a manner similar to that described in Patents Nos. 1,460,419 and 1,460,420, issued to me on July 3, 1923.

The counterpoise consists of a casing 1, provided with the usual trunnions 2 and collapsible tubing 3 which is connected to the ball end of a hollow plunger 4 reciprocable within the casing.

Interposed between the plunger and the casing is the customary packing 5 and grease seal 6. The upper end of the casing is closed by a head 7 retained in place by a nut 8 and provided with a valve 9 through which fluid under pressure, conveniently air, may be admitted to the chamber 10 by means of the passage 11 and ports 12.

Threaded into the open end of the plunger 4 is an apertured plug 13 on which is normally seated a flanged sleeve 14 which carries on its opposite end a bearing 15 having a sliding fit in the plunger. Between the sleeve and the plunger is a helical spring 16 confined by the plug 13 and bearing 15.

A rod 17, of any desired length, is secured to the head 7 and extends into the plunger, passing through the sleeve 14 and bearing 15. The free end of the rod is threaded to adjustably position a nut 18 in order to selectively vary the stroke of the plunger before the nut and bearing 15 are brought into contact.

With the gun in horizontal position, the counterpoise is collapsed as shown in the drawing, the weight of the forward end of the gun being sufficient to counterbalance the expansive force of the fluid in the chamber 10. As the gun is elevated the counterpoise is extended, its full effective power being exerted until the nut 18 engages the bearing 15 at which time the force exerted is diminished by the energy required to compress the spring 16 in an amount sufficient to maintain the opposing forces in constant relation.

In lowering the gun, the spring tends to collapse the counterpoise until such time as the spring is fully extended when the full force of the counterpoise comes into play.

Although one spring will doubtless be sufficient to counteract the excess force exerted by the counterpoise between elevation of 45° to 65°, it is pointed out that when desired to elevate the gun above 65°, two or more springs may be provided in series, any or all of them being under initial compression as may be deemed advisable or found necessary.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A counterpoise for pivotally mounted bodies embodying a casing headed at one end, a fluid pressure actuated plunger reciprocable within the casing, an apertured plug in the inner end of the plunger, a flanged sleeve normally seated against the plug, an apertured bearing on the opposite end of the sleeve, a spring surrounding the sleeve and confined by the plug and bearing, a rod secured to the headed end of the casing and extending through the sleeve and bearing into the plunger, and a nut adjustably carried on the free end of the rod.

2. A counterpoise for pivotally mounted bodies embodying a casing, a fluid pressure actuated plunger reciprocable within the casing, an apertured plug in the inner end of the plunger, a flanged sleeve normally seated against the plug, a bearing on the opposite end of the sleeve, a spring surrounding the sleeve and confined by the plug and bearing, and means carried by the casing and adapted to compress the spring on the outward stroke of the plunger.

3. A counterpoise for pivotally mounted bodies embodying a casing, a fluid pressure actuated plunger reciprocable within the casing, a resilient element associated with the plunger, and means carried by the casing and adjustable to compress said resilient element on the outward stroke of the plunger.

4. A counterpoise for pivotally mounted bodies embodying a casing, a plunger reciprocable within the casing means for extending the counterpoise, and means associated with said plunger and actuated by the casing for diminishing or resisting the effective force of the counterpoise as it nears completion of its outward stroke.

5. A counterpoise for pivotally mounted bodies embodying a casing, a plunger reciprocable within the casing means for extending the counterpoise, and means for diminishing or resisting the effective force of said counterpoise as it nears completion of its outward stroke.

6. A counterpoise for pivotally mounted bodies embodying a casing, a plunger within the casing means for extending the counterpoise, and means operable to supplementarily vary the effective force of the counterpoise in proportion to the variation in the opposing force of the pivoted body.

BRYAN P. JOYCE.